(12) United States Patent
Garcia-Martin et al.

(10) Patent No.: US 7,876,743 B2
(45) Date of Patent: *Jan. 25, 2011

(54) CONVERSATIONAL BEARER NEGOTIATION

(75) Inventors: Miguel-Angel Garcia-Martin, Helsinki (FI); Janne Suotula, Helsingfors (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1888 days.

This patent is subject to a terminal disclaimer.

(21) Appl. No.: 10/777,407

(22) Filed: Feb. 12, 2004

(65) Prior Publication Data

US 2004/0249887 A1   Dec. 9, 2004

(30) Foreign Application Priority Data

Feb. 15, 2003   (GB) ................ 0303516.9

(51) Int. Cl.
*H04L 12/66* (2006.01)

(52) U.S. Cl. ............ 370/352; 370/338; 370/353; 370/354; 370/356; 370/390; 379/88.26; 455/414.1; 455/432.1

(58) Field of Classification Search ......... 370/353–356, 370/359, 235, 313, 338, 352, 381, 401, 390; 379/219, 88.26; 455/445, 414, 432; 709/204; 726/22

See application file for complete search history.

(56) References Cited

U.S. PATENT DOCUMENTS

| | | | | |
|---|---|---|---|---|
| 5,051,982 A | * | 9/1991 | Brown et al. | 370/381 |
| 5,852,718 A | * | 12/1998 | Van Loo | 709/208 |
| 6,157,648 A | * | 12/2000 | Voit et al. | 370/401 |
| 6,389,008 B1 | * | 5/2002 | Lupien et al. | 370/352 |
| 6,392,999 B1 | | 5/2002 | Liu et al. | |
| 6,463,055 B1 | * | 10/2002 | Lupien et al. | 370/353 |
| 6,577,622 B1 | * | 6/2003 | Schuster et al. | 370/352 |
| 6,578,147 B1 | * | 6/2003 | Shanklin et al. | 726/22 |
| 6,608,832 B2 | * | 8/2003 | Forslow | 370/353 |
| 6,621,793 B2 | * | 9/2003 | Widegren et al. | 370/230.1 |
| 6,707,813 B1 | * | 3/2004 | Hasan et al. | 370/356 |
| 6,765,912 B1 | * | 7/2004 | Vuong | 370/395.2 |
| 6,771,639 B1 | * | 8/2004 | Holden | 370/352 |
| 6,775,534 B2 | * | 8/2004 | Lindgren et al. | 455/404.1 |
| 6,813,264 B2 | * | 11/2004 | Vassilovski | 370/352 |
| 6,862,277 B2 | * | 3/2005 | Pan et al. | 370/352 |
| 6,876,646 B1 | * | 4/2005 | Dore et al. | 370/352 |
| 6,904,035 B2 | * | 6/2005 | Requena | 370/338 |

(Continued)

FOREIGN PATENT DOCUMENTS

GB   2367206 A   3/2002

(Continued)

*Primary Examiner*—Gerald Gauthier

(57) ABSTRACT

A method of setting up a session between peer user terminals of a communication system, wherein at least one of the user terminals is a dual-mode terminal having access to both an IP-based packet-switched access network and a circuit-switched access network, and the session extends at least in part across the circuit-switched access network. One of the user terminals initiates the session by sending Session Initiation Protocol (SIP) signaling to a SIP server over the IP-based network. The SIP server sends a notification to a gateway server to establish one or more conversational bearers. The gateway server then sends a callback telephone number to the dual-mode terminal. The dual-mode terminal then calls the callback number to establish a circuit-switched session with the gateway server.

11 Claims, 7 Drawing Sheets

U.S. PATENT DOCUMENTS

| | | | | |
|---|---|---|---|---|
| 6,917,613 | B1* | 7/2005 | Tiburtius et al. | 370/353 |
| 6,985,961 | B1* | 1/2006 | Ramsayer et al. | 709/238 |
| 6,996,087 | B2* | 2/2006 | Ejzak | 370/338 |
| 7,035,248 | B2* | 4/2006 | Wengrovitz | 370/352 |
| 7,058,042 | B2* | 6/2006 | Bontempi et al. | 370/338 |
| 7,116,646 | B1* | 10/2006 | Gustafson et al. | 370/313 |
| 7,123,594 | B2* | 10/2006 | Yang | 370/328 |
| 7,167,468 | B2* | 1/2007 | Donovan | 370/352 |
| 7,180,987 | B2* | 2/2007 | Yau et al. | 379/88.26 |
| 7,302,266 | B1* | 11/2007 | Sill et al. | 455/441 |
| 7,333,505 | B2* | 2/2008 | Yoakum et al. | 370/466 |
| 7,437,162 | B1* | 10/2008 | Zhang et al. | 455/445 |
| 7,443,834 | B1* | 10/2008 | Sylvain | 370/352 |
| 7,463,615 | B2* | 12/2008 | Vassilovski et al. | 370/342 |
| 7,586,913 | B2* | 9/2009 | Okubo et al. | 370/390 |
| 7,606,245 | B2* | 10/2009 | Ma et al. | 370/401 |
| 2002/0068564 | A1* | 6/2002 | Gustavsson et al. | 455/435 |
| 2002/0110104 | A1* | 8/2002 | Surdila et al. | 370/338 |
| 2002/0122401 | A1* | 9/2002 | Xiang et al. | 370/338 |
| 2002/0145975 | A1* | 10/2002 | MeLampy et al. | 370/235 |
| 2003/0027569 | A1* | 2/2003 | Ejzak | 455/432 |
| 2003/0027595 | A1 | 2/2003 | Ejzak | |
| 2003/0050051 | A1* | 3/2003 | Vilander | 455/414 |
| 2004/0008669 | A1* | 1/2004 | Bos et al. | 370/352 |
| 2004/0029615 | A1* | 2/2004 | Gerry et al. | 455/560 |
| 2004/0062232 | A1* | 4/2004 | Sylvain | 370/352 |
| 2004/0062382 | A1* | 4/2004 | Sylvain | 379/265.06 |
| 2004/0086102 | A1* | 5/2004 | McMurry et al. | 379/219 |
| 2004/0092252 | A1* | 5/2004 | Gustavsson et al. | 455/412.2 |
| 2004/0120502 | A1* | 6/2004 | Strathmeyer et al. | 379/265.01 |
| 2004/0252674 | A1* | 12/2004 | Soininen et al. | 370/352 |
| 2005/0025047 | A1* | 2/2005 | Bodin et al. | 370/229 |
| 2005/0207361 | A1* | 9/2005 | Rosenberg et al. | 370/282 |
| 2007/0053343 | A1* | 3/2007 | Suotula et al. | 370/352 |
| 2007/0153982 | A1* | 7/2007 | Bloebaum et al. | 379/33 |
| 2007/0160034 | A1* | 7/2007 | Koretsky | 370/352 |
| 2007/0165599 | A1* | 7/2007 | Skog et al. | 370/352 |
| 2008/0080480 | A1* | 4/2008 | Buckley et al. | 370/352 |

FOREIGN PATENT DOCUMENTS

| | | |
|---|---|---|
| WO | WO 0160094 A1 | 8/2001 |
| WO | WO 0176276 A2 | 10/2001 |
| WO | WO 0191389 A2 | 11/2001 |

* cited by examiner

CONVERSATIONAL BEARER NEGOTIATION

This application claims the benefit of the filing date as provided in 35 U.S.C. 119 of Great Britain patent application number GB 0303516.9 filed on Feb. 15, 2003, the disclosures of which are incorporated herein by reference.

FIELD OF THE INVENTION

The present invention relates to negotiating the setting up of conversational bearers in communication networks, which bearers can be used, for example, to carry real time voice and video information.

BACKGROUND TO THE INVENTION

Digital cellular telephone networks have traditionally relied upon circuit switched channels to carry user traffic such as voice communications. A circuit switched channel is formed by the allocation of one slot per frame in a given TDMA channel. Whilst circuit switched sessions have proved adequate for voice calls, they do not provide an efficient mechanism for transferring large amounts of data which is "bursty" in nature. For example, the setting up of a circuit switched session to download a web page from a web server is likely to result in the connection remaining idle for significant amounts of time, and being overloaded when there is data to transmit.

To facilitate fast data transfers to mobile terminals, packet switched data services are being introduced to digital cellular telephone networks. For example, the General Packet Radio Service (GPRS) is currently being introduced to many GSM networks. Unlike circuit switched sessions, a GPRS session (referred to as a PDP context) for a given user does not necessarily occupy one slot per frame on a given TDMA channel. Rather, slots are only used when the user has data to send or receive. When there is no traffic to transmit, no slots are allocated to the user. When there is a large volume of data to transmit, the user may be allocated one or more slots per frame.

GPRS will be available in future third generation networks such as 3G networks which will rely upon CDMA rather than TDMA. 3G networks will however continue to provide circuit switched services at least for the foreseeable future, although these sessions will not necessarily be end to end. Rather, the links between mobile terminals and the networks will be circuit switched, with data being routed within and between networks via high capacity packet switched networks (which have sufficient bandwidth to handle real time traffic).

It is envisaged that in the future, the packet switched (access) domain will be able to carry real time information streams, for example relating to voice and video telephony. However, at present the transmission reliability of GPRS is not sufficient to provide users with telephony services of the quality which they will expect, hence the continued provision of circuit switched services (the provision of circuit switched services is also likely to be necessary by the need to continue to service older mobile terminal equipment which is not GPRS enabled).

To facilitate the provision of multimedia services via the packet switched "domain", the $3^{rd}$ Generation Partnership project (3GPP) responsible for the 3G standards has been developing a so-called IP Multimedia Core Network Subsystem (IMS). IMS communicates with the GPRS core network and contains all elements that are used to provide IP based multimedia services. For a mobile to mobile call, and assuming the mobiles belong to different networks, an IMS will be provided in each mobile's home network. Each IMS is connected to the GPRS core network of its home network. The base protocol for multimedia services is the IETF Session Initiation Protocol (SIP). SIP makes it possible for a calling party to establish a packet switched session to a called party (using so-called SIP User Agents, UAs, installed in the user terminals) even though the calling party does not know the current IP address of the called party prior to initiating the call. SIP provides other functionality including the negotiation of session parameters (e.g. Quality of Service and codecs).

FIG. 1 illustrates schematically a 3G network providing circuit switched (CS) and packet switched (PS) access networks to a mobile terminal. The figure illustrates a call being made by the mobile terminal, via its circuit switched access network, to a PC which has access only to a packet switched network. The session is initiated by the dialling of a telephone number from the mobile terminal, i.e. this does not involve any exchange of SIP signalling between the home network and the mobile terminal, and SIP URLs cannot be transferred over the CS domain. The destination terminal must have allocated to it a standard telephone number in order for such a session to be established.

Translation between circuit switched and packet switched data is performed by an interworking gateway (GW), with the GW establishing the packet switched session to the PC using SIP signalling. Assuming that the packet switched network used by the PC has sufficient bandwidth (e.g. the network is a broadband network), the call will provide the users with a sufficient level of quality for voice and video. In this scenario, the IMS of the home operator's network is not used.

In addition to the need for the destination terminal to have allocated to it a telephone number, a further disadvantage of the architecture of FIG. 1 is that the destination terminal will not necessarily know that a conversational bearer has been established using a CS access network. Any attempt by the destination terminal to establish some additional (non-conversational) PS bearer will fail, because the gateway cannot provide this service. Also, any attempt by the initiating terminal to establish a (non-conversational) PS bearer may fail because the destination terminal will not be able to associate the set-up request with the existing conversational bearer.

FIG. 2 illustrates an alternative scenario in which a call between the mobile terminal and the PC is established using the PS access network available to the mobile terminal. The call is established using a SIP server of the IMS. Due to the limited bandwidth of the PS access network available to the mobile terminal, the session is unlikely to be of sufficient quality to handle real time voice and video data. A separate CS bearer should be established for this purpose. However, this might not be straightforward given that the initiating or terminating terminal might know only the SIP URL of the peer terminal, and not its telephone number.

SUMMARY OF THE INVENTION

It is likely that users will prefer to initiate and receive circuit switched and packet switched calls using a common signalling interface. However, under the current proposals, a user would initiate and receive a packet switched call using SIP, e.g. to initiate a packet switched call the user would enter the SIP address for the called party (e.g. john@example.org), whilst he/she would initiate and receive a circuit switched call using the DTAP protocol, e.g. to initiate such a call the user would dial the called party's telephone number (e.g. 012345 . . . ). Network operators would also prefer to use a common signalling interface as this will ease the migration of circuit switched services to the packet switched domain, when that domain has evolved sufficiently to provide the required services.

According to a first aspect of the present invention there is provided a method of setting up a session between peer user terminals of a communication system, said session extending at least in part across a circuit switched access network, the method comprising transporting signalling to initiate said session between at least one of the peer user terminals and said communication system via an IP based packet switched access network using a call control protocol which is also used for setting up end-to-end packet switched sessions, and subsequently establishing said session based upon said signalling.

The term "communication system" is used here to indicate either a single communication network or a collection of networks such as the worldwide telecommunications system made up of various national and international networks.

The signalling which initiates said session in the circuit switched domain may do so indirectly. That is to say that this signalling is interpreted by an appropriate node of the communication system as requiring a circuit switched session. The session is then initiated directly by signalling in the circuit switched domain. Said at least one of the peer user terminals may be unaware in the first instance that a circuit switched session is required.

Embodiments of the present invention have the advantage that session initiation signalling relating to both the circuit switched domain and the packet switched domain can be carried exclusively over the packet switched access network.

It is anticipated that the invention will be particularly applicable where the session being initiated requires one or more conversational bearers, although this need not be the case. Said session may be enhanced by one or more media streams not requiring conversational bearers and establish through the packet access network, e.g. where the session requires one or more conversational bearers, but additionally, is complemented with one or more non-conversational bearers (instant messaging, gaming, etc.). These bearers are established through the packet access network/domain.

Preferably, at least one of the peer user terminals is a dual mode mobile terminal capable of using both said packet switched and circuit switched access networks.

Preferably, said call control protocol is Session Initiation Protocol, SIP, with SIP signalling being exchanged between said at least one of the peer user terminals and a SIP server of an IP Multimedia Core Network Subsystem (IMS). More preferably, said SIP server notifies a gateway server when it receives a session initiation request which requires the establishment of one or more conversational bearers, the gateway terminating the circuit switched session within the system. The gateway provides interworking between the circuit switched session on the one side, and the packet switched session on the other side. The SIP server and the gateway server may be physically co-located.

Typically, following notification from the server, the gateway notifies said at least one of the peer user terminals, via the SIP server, of a callback telephone number, and the peer user terminal calls that number to establish a circuit switched session with the gateway. The gateway maps the established circuit switched session to the SIP signalling session on the basis of the used callback number. Preferably, the gateway selects the callback number from a pool of available callback numbers.

Preferably, the SIP server determines that said session requires the establishment of a circuit switched session as a result of one or more of the following:

properties of the system known to the SIP server;
prior notification by said at least one of the peer user terminals;
information contained in the SIP signalling initiating the session;
properties defined for the peer user terminal;
prior notification from a visited network in the case of a roaming user terminal; and
prior notification from the radio access network used by the peer user terminal.

Preferably, at least one of the peer user terminals maps the established circuit switched session to the signalling session over the packet switched domain, such that both session can be terminated together.

In an embodiment of the present invention, said peer user terminals are mobile wireless terminals, said at least one of the peer user terminals being a dual mode mobile terminal capable of using both said packet switched and circuit switched access networks. The other mobile terminal may similarly be a dual mode terminal, or may be a single mode terminal capable of accessing only a circuit switched access network (or indeed only a packet switched access network). In other embodiments of the invention, said at least one of the peer user terminals may be a fixed line terminal, e.g. with a broadband link to said communication system providing both packet switched and circuit switched access. Of course other configurations are possible, e.g. said at least one of the peer user terminals is a dual mode wireless terminal and the other user terminal is a fixed line terminal.

SIP is one example of a call control protocol for setting up sessions over the packet switched and circuit switched networks and which is transported over the packet switched network. Other call control protocols such as H.323 may be used.

According to a second aspect of the present invention there is provided a user terminal comprising means for using a circuit switched access network and means for using an IP based packet switched access network, and means for transferring signalling information, using a call control protocol which is also used for setting up end-to-end packet switched sessions, over the packet switched network to initiate a session over the circuit switched network.

According to a third aspect of the present invention there is provided a Session Initiation Protocol server for use in an IP Multimedia Core Network Subsystem, the server comprising:

means for receiving an INVITE request from a user terminal, over an IP based packet switched domain, initiating a session;
means for determining that said session requires the setting up of one or more conversational bearers in the circuit switched domain; and
means for causing said conversational bearer(s) to be established.

According to a fourth aspect of the present invention there is provided a gateway server for providing an interface between a circuit switched access network and a packet switched network, the gateway having an interface towards a Session Initiation Protocol server of an IP Multimedia Core Network Subsystem, and means for receiving from the SIP server signalling instructing the establishment of a session over the circuit switched access network with a user terminal.

DETAILED DESCRIPTION OF A PREFERRED EMBODIMENT OF THE INVENTION

Figure 1:
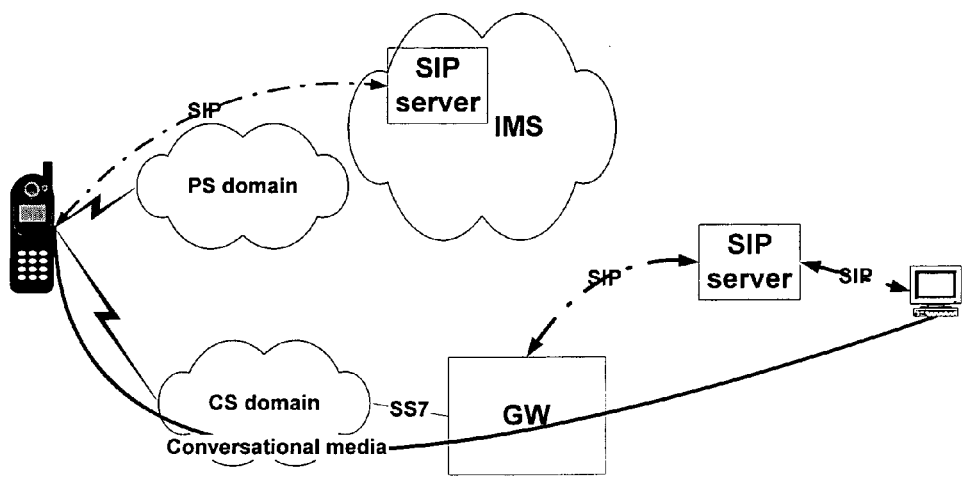
FIG. 1 illustrates a session established between two peer nodes of a telecommunications system over circuit switched and packet switched access networks.
Figure 2:
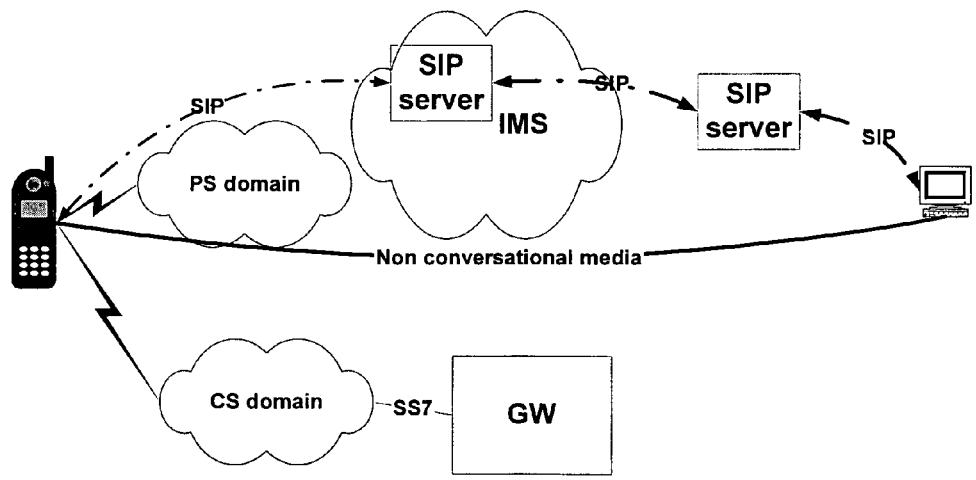
FIG. 2 illustrates a session established between two peer nodes of a telecommunications system over respective packet switched access networks.

Typical call session scenarios in existing and proposed telecommunication networks have been described above with reference to FIGS. 1 and 2.

Figure 3:
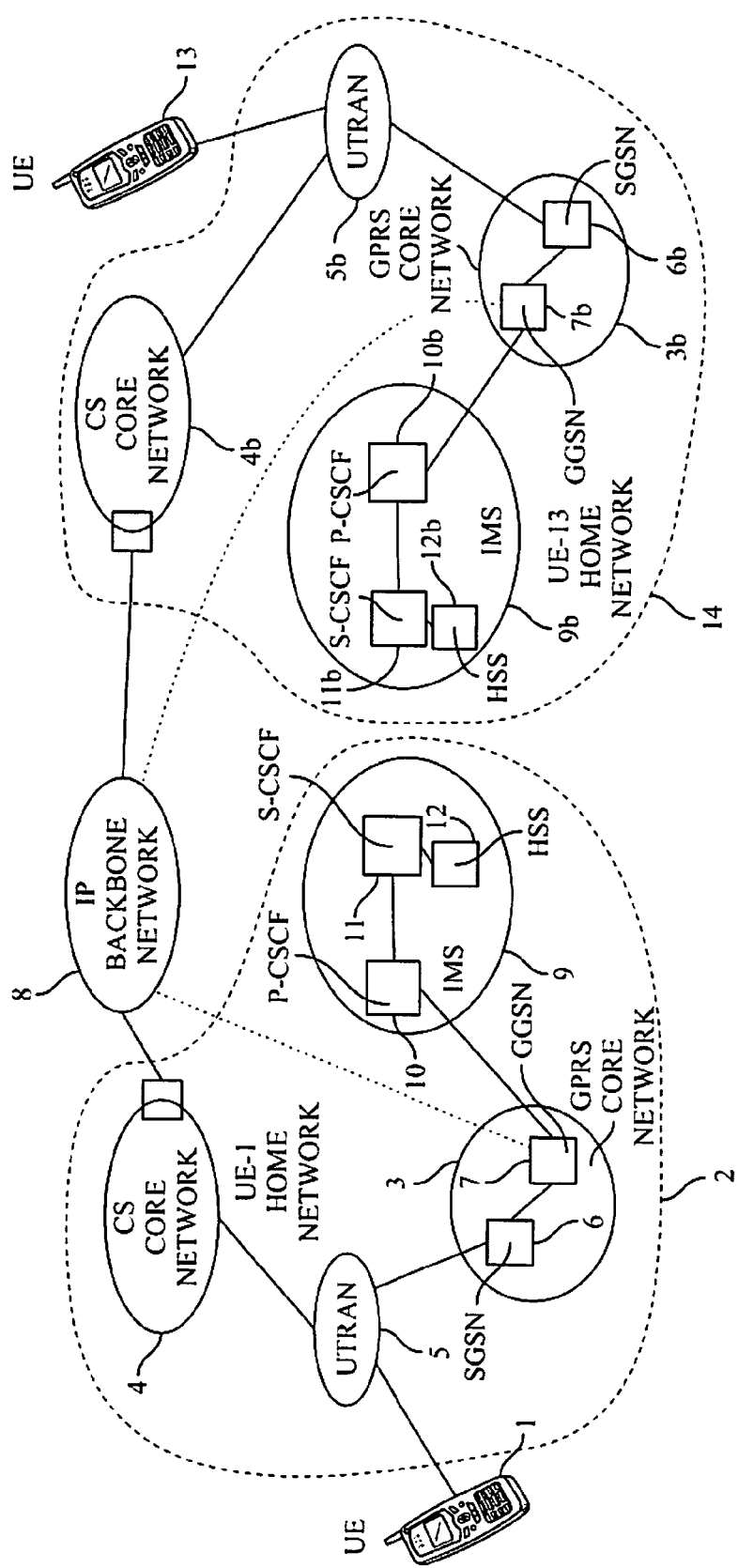
FIG. 3 illustrates in detail an architecture for allowing a packet switched session to be established between peer mobile terminals using SIP.

FIG. 3 illustrates schematically a typical scenario where the user of a mobile terminal or "User Equipment" (UE) 1 is a subscriber of a 3G cellular telephone network 2 (the subscriber's home network). The UE 1 is a dual mode terminal, e.g. as specified in 3GPP Release 5 (dual CS-IMS/PS). The subscriber using the UE is identified in the home network 2 by a unique subscriber identity (e.g. International Mobile Subscriber Identity, IMSI), and the network is referred to as the subscriber's "home" network. The home network comprises a General Packet Radio Service (GPRS) core network 3 and a circuit switched core network 4. Both the core networks 3,4 make use of a common UMTS Radio Access Network (UTRAN) 5. In addition to or as an alternative to the UTRAN, a UE may communicate with the core networks via a GERAN (GSM/EDGE Radio Access Network).

Within the GPRS network 3, two nodes relevant to the UE 1 can be identified. These are the Serving GPRS Support node (SGSN) 6 and the Gateway GPRS Support Node (GGSN) 7. The role of the SGSN 6 is to maintain subscription data—identities and addresses—and to track the location of the UE 1 within the network. The role of the GGSN 7 is to maintain subscription information and allocated IP addresses and to track the SGSN to which the UE 1 is attached. The GGSN 7 is coupled to an IP backbone network 8 (the SGSN is also coupled to the IP network 8, although this session is not shown in the Figure—communication between nodes of the GPRS network, including the GGSN and the SGSN, and between gateway nodes of the UTRAN and the GPRS network, will take place via the IP network 8). Typically, when the UE 1 is turned on it "attaches" itself to the GGSN and a PDP context is established between the UE 1 and the GGSN 7. This context provides a "pipe" for transporting data from the UE 1 to the GGSN 7. This process involves the allocation of an IP address to the UE 1. Typically, the routing prefix part of the address is a routing prefix allocated to the GGSN 7.

Also illustrated in FIG. 3 is an IP Multimedia Core Network Subsystem (IMS) 9 which contains all of the elements required to provide IP based multimedia services in the packet switched domain, and which communicates with mobile terminals. The functionality provided by the IMS 9 is set out in 3GPP V5.6.0. The IMS 9 consists of a set of nodes which communicate between themselves and with nodes outside of the IMS via the IP backbone network 8 (these sessions are not shown in the Figure). Illustrated within the IMS 9 are a proxy call state control function (P-CSCF) node 10 and a serving call state control function (S-CSCF) node 11. It is assumed here that the IMS is owned by the operator of the home network 2 (although this need not be the case). In the case of a roaming subscriber, the UTRAN and core networks will of course belong to a "visited" network. The P-CSCF will also belong to the visited network, whilst the S-CSCF and the HSS (Home Subscriber Server) will be located in the home network. A subscriber is identified within the IMS by an IMPI (IP multimedia private identity) which has a unique relation with the IMS subscription.

The S-CSCF 11 performs the session control services for the UE, and maintains a session state as needed by the home network operator for support of services. The main function performed by the S-CSCF 11 during a session is the routing of incoming and outgoing call set-up requests. The main function performed by the P-CSCF 10 is to route SIP messages between the UE 1 and the IMS 9 of the home network 2.

Following GPRS attach by the UE 1, the UE must "discover" the identity (i.e. IP address) of the P-CSCF which it should use. This is done using one of the following mechanisms:

1. Use of DHCP to provide the UE with the domain name of a Proxy-CSCF and the address of a Domain Name Server (DNS) that is capable of resolving the Proxy-CSCF name.
2. Transfer of a Proxy-CSCF address within the PDP Context Activation signalling to the UE (this second alternative is used for terminals not supporting DHCP).

The UE 1 will then notify the S-CSCF 11 of its current location, i.e. the IP address allocated by the GGSN, via the P-CSCF 10 (this process requires authentication of the UE 1 to the S-CSCF and vice versa and makes use of the unique subscriber identity). The S-CSCF 11 makes this information available to a Home Subscriber Server 12 which is used to route subsequent incoming calls to the UE 1.

Illustrated in FIG. 3 is a UE 13 belonging to a subscriber referred to below as the B-subscriber. The UE 13 is attached to its own home network 14. This network 14 mirrors the home network 2 used by the UE 1, and like numerals, suffixed with a "b", are used to identify components of the network 14. The following discussion assumes that the UE 1 or "A-subscriber" wishes to establish a multimedia call to the UE 13 or "B-subscriber" using the packet switched domain. The UE 1 first sends a SIP INVITE message to the P-CSCF node 10. The INVITE message contains a SIP address of the UE 13 (e.g. john@example.org) as well as an identification of the service required. The P-CSCF node 10 forwards the INVITE message to the S-CSCF node 11.

The S-CSCF 11 verifies the rights of the UE 1 (or rather the subscriber using the UE 1) to use the requested service which is identified in the INVITE message. The S-CSCF 11 must then identify the IP address of the UE 13. It does this by using a look-up table mapping SIP addresses to IP addresses. For a given SIP address, the table provides the IP address of the "home" network of the corresponding subscriber. The identified IP address is used to forward the INVITE message to the S-CSCF 11b in the B-subscriber's home IMS network 9b. Using the SIP address contained in the INVITE message, the S-CSCF 11b identifies the current IP address of the UE 13, and forwards the INVITE message to that address. Upon receipt of the INVITE message, and assuming that the UE 13 answers the call, an OK message is returned to the UE 1. Typically this message is sent via the two S-CSCFs 11,11b. In order to confirm that the OK message is correctly received by the UE 1, that UE will upon receipt of the message return an ACK message to the peer UE 13. If UE 13 does not receive an ACK message within some predefined time period, it will retransmit the OK message.

As well as its use in establishing PS sessions between mobile terminals, SIP may also be used to establish PS sessions between mobile and fixed terminals and between only fixed terminals. For example, SIP may be used to establish a PS session between a mobile subscriber and a fixed terminal which has a broadband session to the Internet.

As mentioned above, the quality of the packet switched links between the UEs 1,13 and the respective UTRANs may be such that these links are not suitable for transporting real time conversational data, such as voice and video data associated with a call, between the two peer UEs or between one of the UEs and a fixed terminal. Thus, it may be necessary to establish a circuit switched session between the or each UE 1,13 and its circuit switched core network 4,4b. The following mechanism is used to establish these circuit switched sessions.

A UE is assumed to have a PS domain session to the IMS of its home network, and the UE is registered with the IMS domain. The SIP UA of the UE has already informed its IMS SIP server (which will typically be the S-CSCF of the home network, but could be a P-CSCF of a visited network), e.g. during registration, that conversational bearers should not be established over the PS domain, and that the SIP UA will use the CS domain for such bearers (this requirement may be a default setting for the UE). However, the PS domain and the SIP server are used to convey signalling to set up the conversational bearers over the CS domain. It will be understood that, rather than the UE signalling to the SIP server that conversational bearers should be set up over the CS domain, this requirement may already be know to the SIP server (e.g. it could be a "property" defined for the subscriber), or the SIP server may be informed of the requirement by a visited network used by the UE as its access network.

Figure 4:
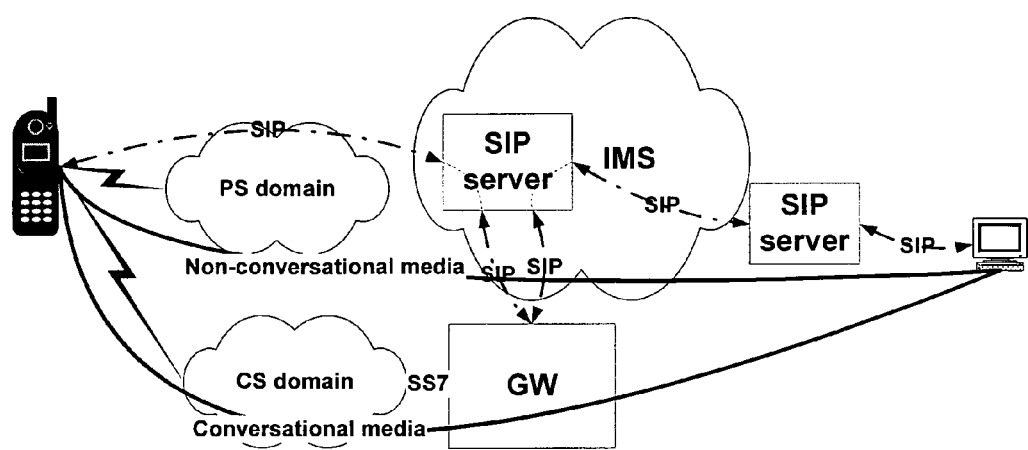
FIG. 4 illustrates a procedure for setting up a conversational bearer in the CS domain using signalling sent over the PS domain.

This procedure is illustrated in FIG. 4, where a conversational bearer is established between a UE 20 (attached via a UTRAN of a 3G network to PS and CS core networks 21,23) and a fixed terminal 24 (e.g. a PC having a broadband Internet session). A gateway 25 provides a node for terminating CS domain sessions between the UE 20 and the home network. The structure of the networks (CS, PS, IMS) associated with the home operator of the UE 20 are not shown in detail in the Figure, although it will be appreciated that these will take the form illustrated in FIG. 3. The gateway 25 communicates with the SIP server 26 (S-CSCF) of the home network IMS 26, e.g. via an IP backbone network (not shown). The SIP server 26 sees the gateway 25 as an application server which will provide a service to the UE 20. The gateway acts, from the SIP point of view, as a transparent Back-to-Back UA (and can modify the Session Description Protocol in a SIP message). Alternatively, the gateway may act as a non-transparent Back-to-Back UA. As the gateway 25 is present not only in the media path, but also in the signalling path, the gateway can provide SIP/SS7 interworking functions.

(The SIP server and the gateway may, in some implementations, be physically co-located, either in the home network of a subscriber or in a visited network.)

Following receipt by the SIP server 26 of a SIP INVITE from the UE 20 requesting the setting up of a conversational bearer, the gateway 25 is notified and allocates a "call-back" number to the session. The UE 20 is informed of this number and calls it to established a CS session to the gateway 25. SIP is used to establish the session between the gateway 25 and the called party 24. This procedure is defined in more detail as follows, from the point of view of the mobile terminal as initiating terminal, with reference to the signalling diagram of FIG. 5:

1. The originating UE sends a SIP INVITE to the home IMS requesting the establishment of a session, the session requiring one or more media streams requiring conversational bearers. The INVITE contains the SIP address of the called party, e.g. sip:john@example.org.
2. The SIP server of the home IMS routes the session attempt signalling to the gateway.
3. The gateway allocates an IP address and port number to the session on the outgoing side, i.e. towards the called party (the conversational bearer is carried between the gateway and the called party in this example entirely over the PS domain). The gateway modifies the SDP in the INVITE by adding the allocated IP address and port number, and forwards the modified message back to the SIP server.
4. The SIP server routes the INVITE towards the called party.
5. The gateway selects an appropriate callback telephone number (e.g. 123) and sends this back to the SIP server, i.e. using a SIP REFER method (although this could be done by including the number in a provisional message). Typically, the gateway will have access to a pool of callback numbers. Additionally, the gateway can provide informational messages to the originating UE in the form of SIP instant messages. These could for example contain information about the status of the call and the price of the call.
6. The SIP server routes the SIP REFER to the originating UE.
7. The originating UE will initiate a call to the allocated callback number 123 using the CS domain.
8. The CS domain (MSC) routes the call set-up request IAM to the gateway.

The gateway is able to associate the incoming call with the previous SIP dialogue based on the used callback number.

9. The SIP server receives an answer 200 OK from the home network of the called party.
10. This response is routed to the gateway.
11. Upon receipt of the response, the gateway will create an answer message ANM towards the CS domain (MSC). The gateway will also through connect the SIP and CS call legs.
12. The CS domain forwards the answer CONNECT to the originating UE 1. At this point, the conversational bearer is established.
13&14. The gateway forwards the response 200 OK to the originating UE via the SIP server.
15-18. The UE 1 generates an acknowledgement message and this is routed to the called party.

The sequence described above is exemplary only, and may modified as required. In addition, whilst it has been assumed that no pre-existing session has been established between the originating UE and the called party, the procedure is also applicable when such a session exists prior to the establishment of a conversational bearer.

Figure 6:
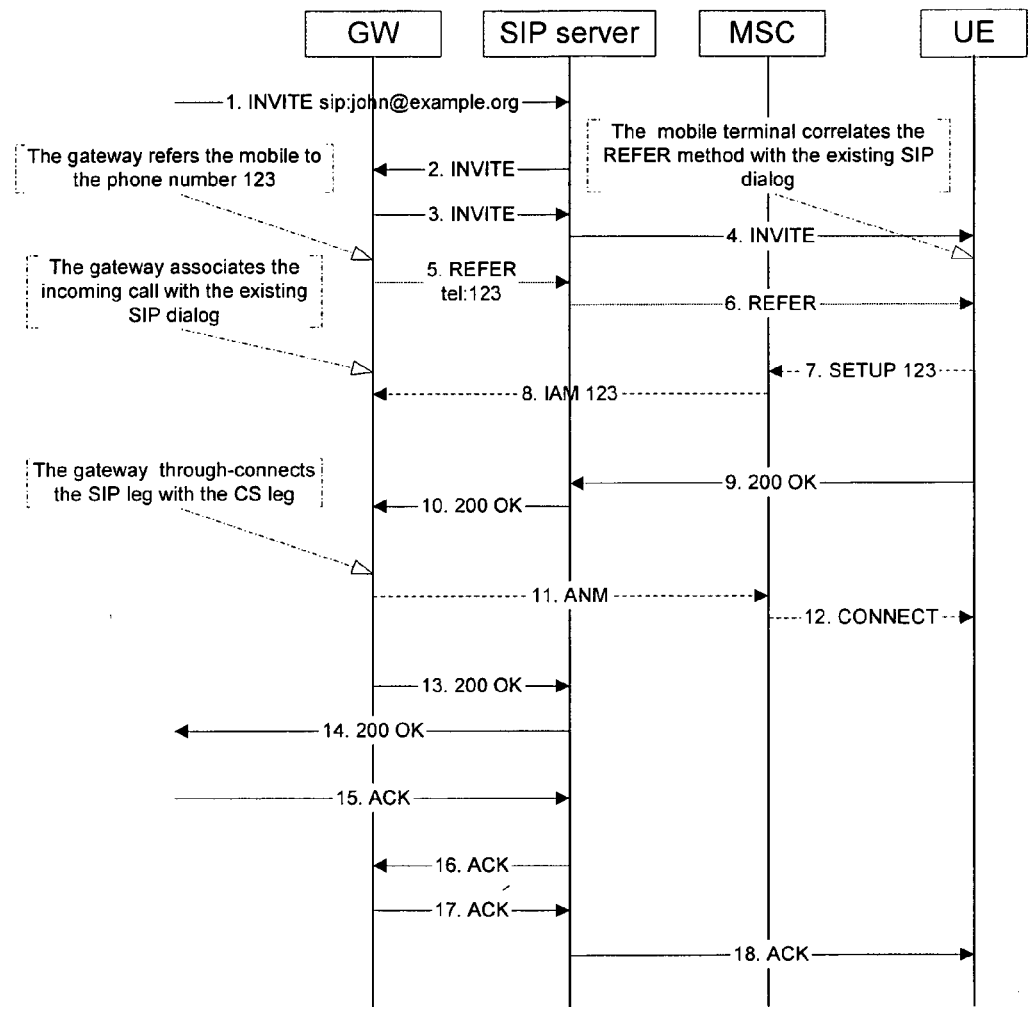
FIG. 6 illustrates signalling associated with the procedure of FIG. 4, where a mobile terminal terminates the bearer.

FIG. 6 illustrates the signalling associated with setting up a conversational bearer over the PS domain from the point of view of the mobile terminal as terminating terminal. The steps in the procedure are as follows:

1. The SIP server in the home IMS of the terminating UE receives a SIP INVITE requesting the establishment of one or more media components requiring conversational bearers.
2. The SIP server determines that for the terminating UE the CS domain must be used to establish the requested components. The INVITE is therefore routed to a gateway interconnecting the CS domain to the packet switched backbone network.
3. The gateway allocates an IP address and port number to the session on the incoming side, i.e. towards the called party. The gateway modifies the SDP in the INVITE by adding the allocated IP address and port number, and routes the INVITE back to the SIP server.
4. The SIP server routes the INVITE to the terminating UE.
5. The gateway determines a callback telephone number, again 123, and sends it to the SIP server using the SIP REFER method.
6. The SIP server routes the SIP REFER to the terminating UE.
7. The terminating UE initiates a call to the notified callback number 123 over the CS domain.
8. The CS domain (MSC) routes the call set-up request IAM to the gateway, where the gateway associates the call with the SIP dialogue based upon the used callback number.
9. The SIP server receives the answer 200 OK from the terminating UE.
10. The SIP server routes the answer to the gateway.
11. The gateway will, following receipt of the answer from the SIP server, create an answer ANM towards the CS domain (MSC). The gateway can also through connect the SIP and CS call legs.
12. The CS domain forwards the answer CONNECT to the terminating UE.
13&14. The SIP answer 200 OK is routed towards the IMS of the originating network.
15-18. An acknowledgement ACK is routed towards the terminating mobile terminal.

Figure 5:
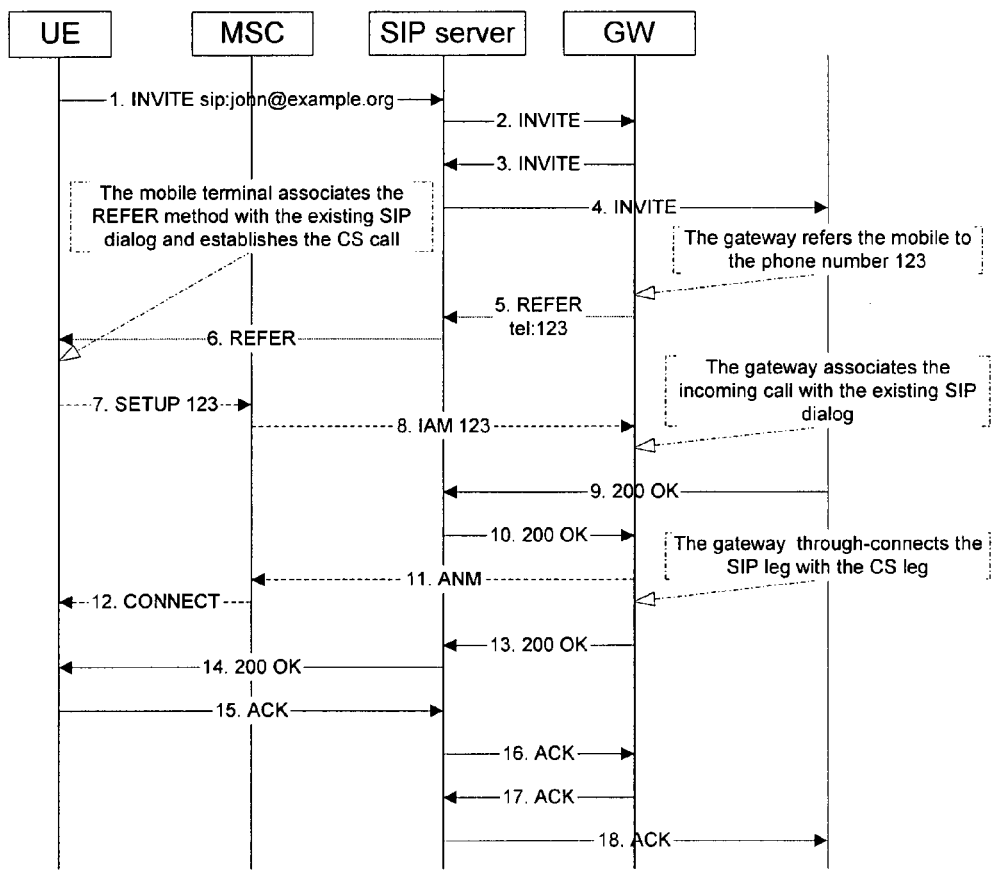
FIG. 5 illustrates signalling associated with the procedure of FIG. 4, where a mobile terminal initiates the bearer.
Figure 7:
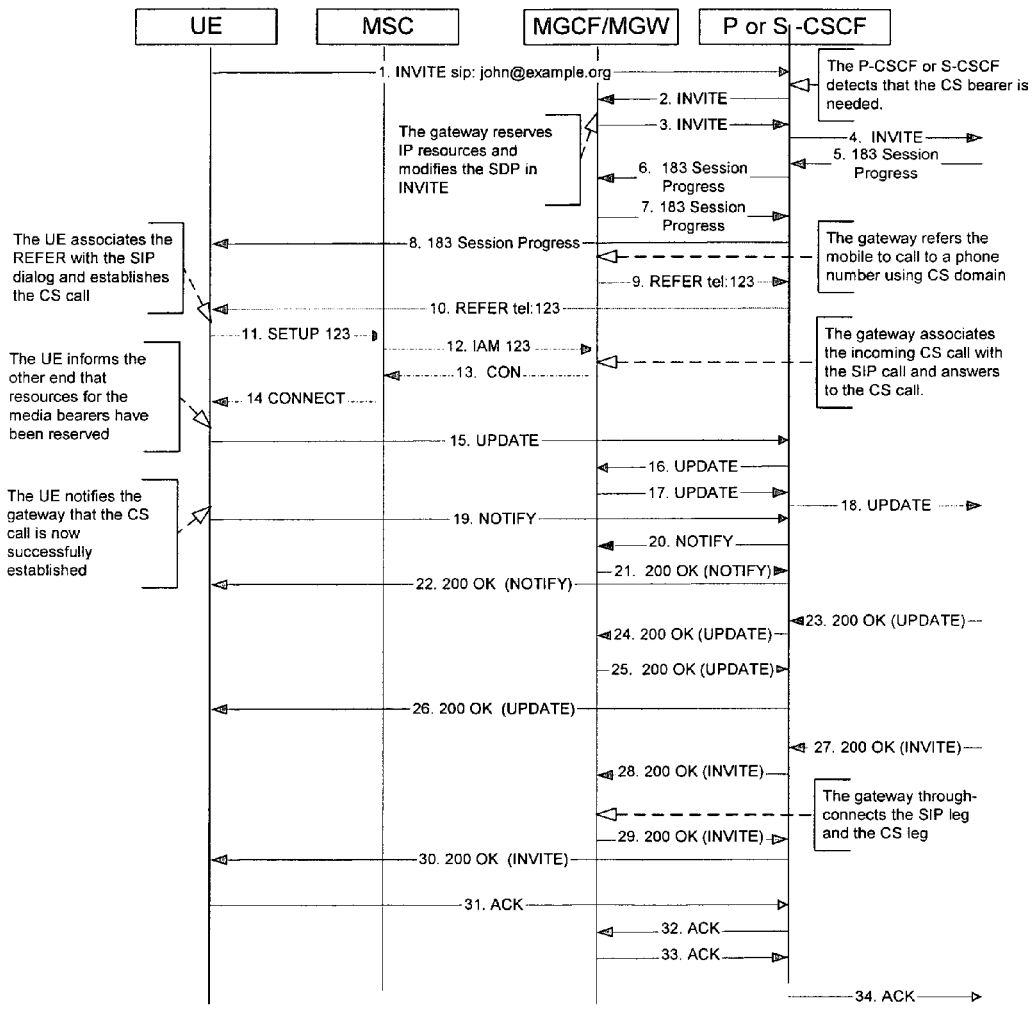
FIG. 7 illustrates in detail signalling associated with a mobile initiated call in a 3GPP network.

FIGS. 5 and 6 illustrate signalling at the generic level. Particular implementations will probably involve additional signalling for at least some of the illustrated signalling "steps". FIG. 7 illustrates the signalling associated with a mobile initiated call, where there is a need to establish conversational bearers over the CS access network, in a 3GPP network. The signalling steps shown are:

1. The mobile terminal sends a SIP INVITE request to the user's IMS network in order to establish a session, the session having one or more media streams requiring conversational bearers (e.g., audio, video). Additionally the mobile terminal may request to establish media streams requiring non-conversational bearers (e.g. text chat, whiteboarding).
2. The P-CSCF (or the S-CSCF) in the IMS network knows that the packet switched access cannot provide the conversational bearer to the mobile user. Therefore it routes the session attempt signalling to the gateway (composed of the MGCF and MGW).
3. The gateway allocates an IP address and a port number for the media on the outgoing side. The gateway modifies the SDP in the INVITE by adding the IP address and the port number and forwards it back to the P-CSCF (or the S-CSCF).
4. The P-CSCF (or the S-CSCF) routes the INVITE towards the terminating user.
5. The P-CSCF (or the S-CSCF) receives the 183 response from the terminating side.
6. The P-CSCF (or the S-CSCF) routes the 183 response to the gateway.
7. The gateway routes the 183 response to the P-CSCF (or the S-CSCF).
8. The P-CSCF (or the S-CSCF) routes the 183 response to the originating user. (Notice that the complete call flow would include the sending of provisional response PRACK message from the UE and 200 OK for PRACK. Notice also that the UE would do the PDP-context activation for the media stream not requiring the conversational bearers at this stage).
9. The gateway selects an appropriate callback telephone number (123 in the example) and sends it back to the terminal (using e.g., a SIP REFER method). Note: The gateway can have a pool of telephone numbers in order to serve many simultaneous calls; it just need to choose an available call-back number and allocate it to the mobile user.
10. The SIP server routes the SIP REFER request to the UE.
11. The UE will initiate a call using the CS domain. The destination telephone number is 123 (the one received in the SIP REFER message in step 10 above).
12. The CS domain MSC routes the call to the gateway. The gateway can associate the incoming CS call with the SIP dialog due to the call was terminating to this callback telephone number.
13. The gateway answers the CS call.
14. The CS domain forwards the answer to the UE. (Notice that the UE should not show any call state information of the CS call to the end user because the CS call is used only as a media bearer for the SIP session.)
15. 16. 17. & 18. The UE informs the other end that resource reservation was successful by sending the UPDATE message which is routed towards terminating user by the IMS network.
19 & 20. The UE informs the gateway that CS call is now successfully established by sending the NOTIFY message.
21 & 22. The gateway sends response to the NOTIFY to the UE.
23. 24. 25. & 26. The 200 OK for UPDATE is routed to the UE.
27. & 28. (Notice that in the complete sequence the originating network and the UE would receive an response indicating that the terminating UE is ringing to the end user.) The P-CSCF (or the S-CSCF) 200 OK for the INVITE and routes it to the gateway.
29. The gateway through-connects the SIP call leg and the CS call leg and routes the 200 OK for INVITE to the P-CSCF (or to the S-CSCF).
30. The P-CSCF (or the S-CSCF) routes 200 OK for the INVITE to the UE.
31. 32. 33. & 34 The UE sends the acknowledgement, which is routed towards the terminating user.

Figure 8:
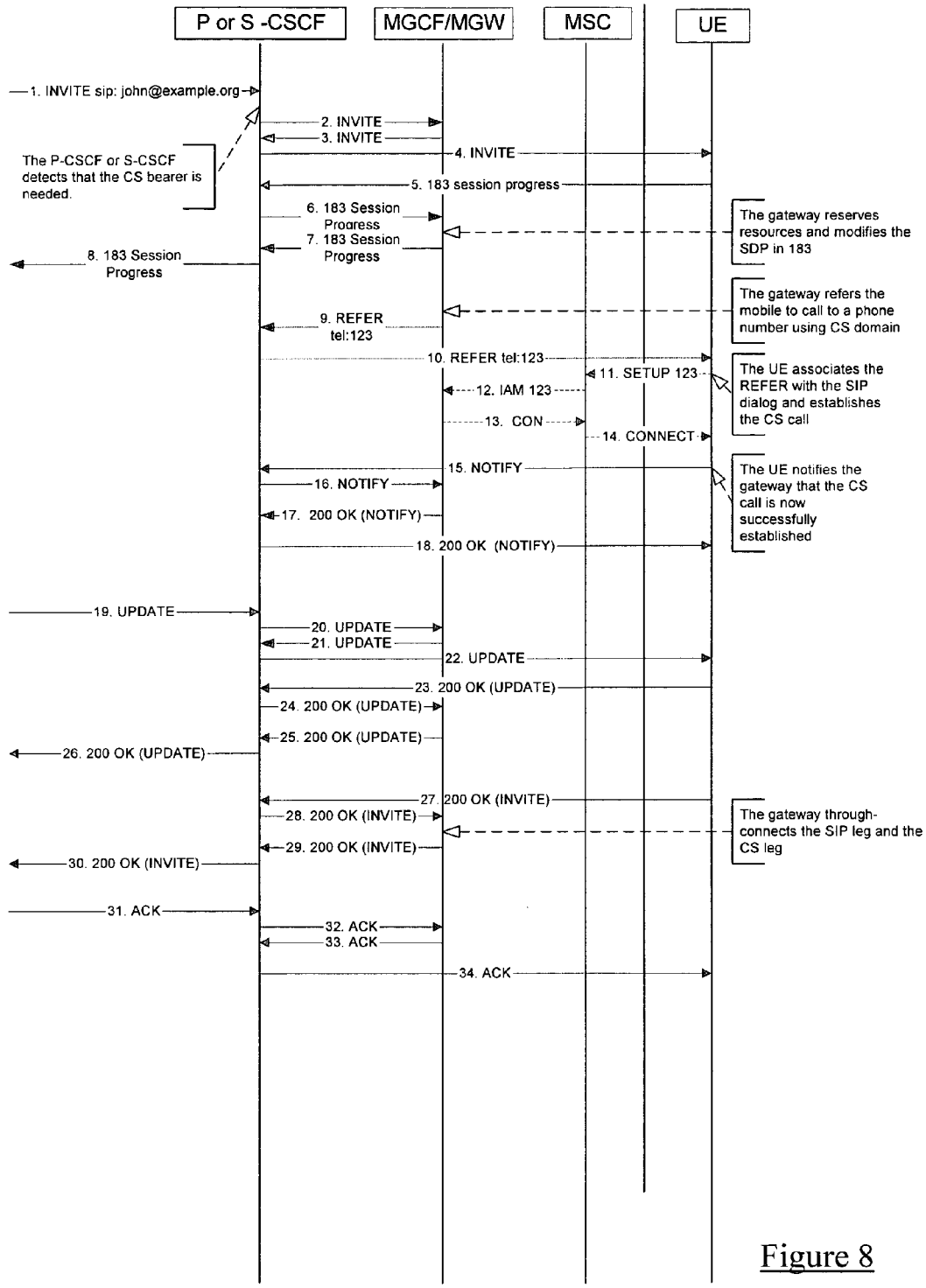
FIG. 8 illustrates in detail signalling associated with a mobile terminated call in a 3GPP network.

FIG. 8 illustrates the signalling associated with a mobile terminated call in a 3GPP network. The signalling steps shown are:

1. The P-CSCF (or the S-CSCF) receives a SIP INVITE request in order to establish a session, the session having one or more media streams requiring conversational bearers (e.g., audio, video). Additionally the request may include an order to establish media streams requiring non-conversational bearers (e.g. text chat, whiteboarding).
2. The P-CSCF (or the S-CSCF) in the IMS network knows that the packet switched access cannot provide the conversational bearer to the mobile user. Therefore it routes the session attempt signalling to the gateway (composed of the MGCF and MGW).
3. The gateway forwards the INVITE back to the P-CSCF (or the S-CSCF).
4. The P-CSCF (or the S-CSCF) routes the INVITE towards the terminating user.
5. The P-CSCF (or the S-CSCF) receives the 183 response from the terminating side.
6. The P-CSCF (or the S-CSCF) routes the 183 response to the gateway.
7. The gateway allocates an IP address and a port number for the media on the outgoing side. The gateway modifies the SDP in the 183 response to the P-CSCF (or the S-CSCF)
8. The P-CSCF (or the S-CSCF) routes the 183 response to towards the originating user. (Notice that the complete call flow would include the sending of provisional response for the 183 (PRACK message and 200 OK for PRACK)).
9. The gateway selects an appropriate callback telephone number (123 in the example) and sends it back to the terminal (using e.g., a SIP REFER method). Note: The gateway can have a pool of telephone numbers in order to serve many simultaneous calls; it just need to choose an available call-back number and allocate it to the mobile user.
10. The SIP server routes the SIP REFER request to the UE.
11. The UE will initiate a call using the CS domain. The destination telephone number is 123 (the one received in the SIP REFER message in step 10 above).
12. The CS domain MSC routes the call to the gateway. The gateway can associate the incoming CS call with the SIP dialog due to the call was terminating to this callback telephone number.
13. The gateway answers the CS call.
14. The CS domain forwards the answer to the UE. (Notice that the UE should not show any call state information of the CS call to the end user because the CS call is used only as a media bearer for the SIP session.)
15. & 16. The UE informs the gateway that CS call is now successfully established by sending the NOTIFY message.
17. & 18. The gateway sends response to the NOTIFY to the UE.
18. 20. 21. & 22. The UE receives UPDATE message informing that the that the resource reservation was successful for the originating UE.
23. 24. 25. & 26. The UE send the 200 OK for the UPDATE message towards the originating user. (Notice that in the complete sequence the UE would send a response to the originating UE informing that the phone is ringing now.)
27. & 28. The end user answers the call and the UE sends 200 OK response for the INVITE which is routed to the gateway by the P-CSCF (or the S-CSCF).
29. The gateway through-connect the SIP call leg and the CS call leg and routes the 200 OK for INVITE to the P-CSCF (or to the S-CSCF).
30. The P-CSCF (or the S-CSCF) routes 200 OK for the INVITE towards the originating UE.
31. 32. 33. & 34 The terminating UE receives the acknowledgement from the originating UE.

It will be appreciated by the person of skill in the art that various modifications may be made to the above described embodiments without departing from the scope of the present invention. For example, in an alternative solution the SIP server itself determines the call back number and sends this to the UE. When the UE calls to the number, the call is routed to the gateway, which then establishes a SIP call to the SIP server (notice that this is an additional SIP session from SIP server point of view). The SIP server collects the IP address and port number allocated by the gateway from that SIP signalling and modifies the SDP in the INVITE. However, a disadvantage of this approach is that the INVITE cannot be sent to the terminating side before the CS call is received from the originating UE as it will not know the allocated IP address and port number until the call is received. Also the logic in the SIP server may be complex.

The invention claimed is:

1. A method of setting up a session between first and second peer user terminals of a communication system, wherein at least one of the peer user terminals is a dual-mode mobile terminal having access to an Internet Protocol (IP) based packet switched network and a circuit switched access network, said session extending at least in part across the circuit switched access network, the method comprising the steps of:

transporting signaling to initiate the session via the IP based packet switched network using a call control protocol which is also used for setting up end-to-end packet switched sessions, the signaling being Session Initiation Protocol (SIP) signaling exchanged between the dual mode mobile terminal and a SIP server of an IP Multimedia Core Network Subsystem (IMS);

sending a notification from the SIP server to a gateway server that one or more conversational bearers must be established, the gateway server terminating the circuit switched session within the system;

after notification from the SIP server, sending from the gateway server to the dual-mode mobile terminal, a callback telephone number; and calling the callback telephone number by the dual-mode mobile terminal to establish a circuit switched call with the gateway server.

2. The method according to claim 1, further comprising utilizing the circuit switched call to provide the one or more conversational bearers.

3. The method according to claim 2, further comprising utilizing the packet switched session to provide non-conversational bearers established over said IP based packet switched network.

4. The method according to claim 1, wherein said SIP server and said gateway server are co-located.

5. The method according to claim 1, wherein the gateway server provides interworking between the circuit switched call and the packet switched session.

6. The method according to claim 1, wherein at least one peer user terminal is notified of the callback telephone number via the SIP server.

7. The method according to claim 6, wherein the gateway server maps the established circuit switched call to the packet switched session based on the callback telephone number.

8. The method according to claim 1, wherein the gateway server selects the callback telephone number from a pool of available callback numbers.

9. The method according to claim 1, further comprising determining by the SIP server that the packet switched session requires setting up a circuit switched call as a result of one or more of the following:

properties of the system known to the SIP server;
prior notification by at least one of the peer user terminals;
information contained in the SIP signaling initiating the packet switched session;

properties defined for at least one of the peer user terminals;

prior notification from a visited network if one of the peer user terminals is roaming; and prior notification from the packet switched access network used by one of the peer user terminals.

10. A Session Initiation Protocol (SIP) server for use in an Internet Protocol (IP) Multimedia Core Network Subsystem, the server comprising:

means for receiving an INVITE request from a dual-mode user terminal, over an IP based packet switched domain, initiating a packet switched session;

means for determining that the packet switched session requires setting up of at least one circuit switched conversational bearer over a circuit switched access network serving the dual-mode user terminal;

means for sending a notification from the SIP server to a gateway server that one or more conversational bearers must be established, the gateway server terminating the circuit switched session within the system; and means for receiving a callback telephone number from the gateway server and for forwarding the callback number to the dual-mode terminal.

11. A gateway server for providing an interface between a circuit switched access network and a packet switched network, the gateway server having an interface towards a Session Initiation Protocol (SIP) server of an Internet Protocol (IP) Multimedia Core Network Subsystem, said gateway server comprising:

means for receiving from the SIP server, signaling instructing the setting up of a circuit switched call over the circuit switched access network with a dual-mode user terminal;

means for sending a callback number to the dual-mode user terminal in response to receipt of the signaling; and means for terminating a call made to the callback number by the dual-mode user terminal.

* * * * *